H. LEAH.
BRAKE RELEASE SPRING MECHANISM FOR TRAM AND THE LIKE CARS.
APPLICATION FILED JULY 20, 1921.
1,421,697.
Patented July 4, 1922.
2 SHEETS—SHEET 1.
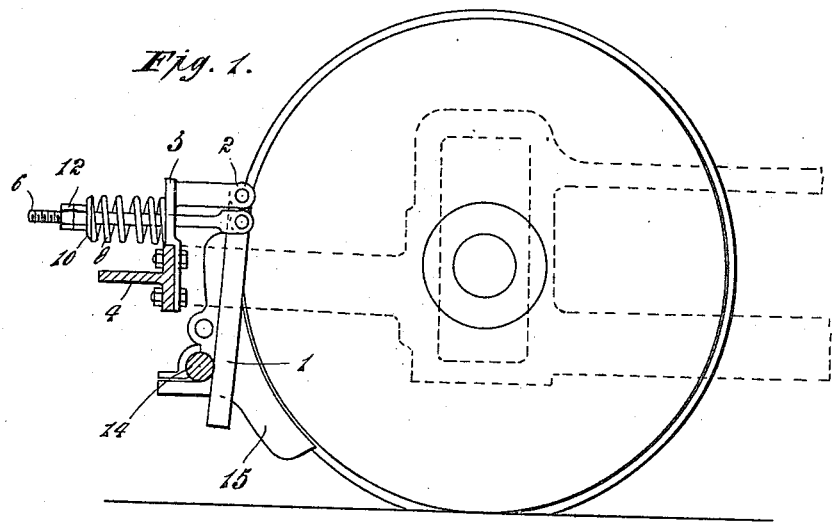
Fig. 1.
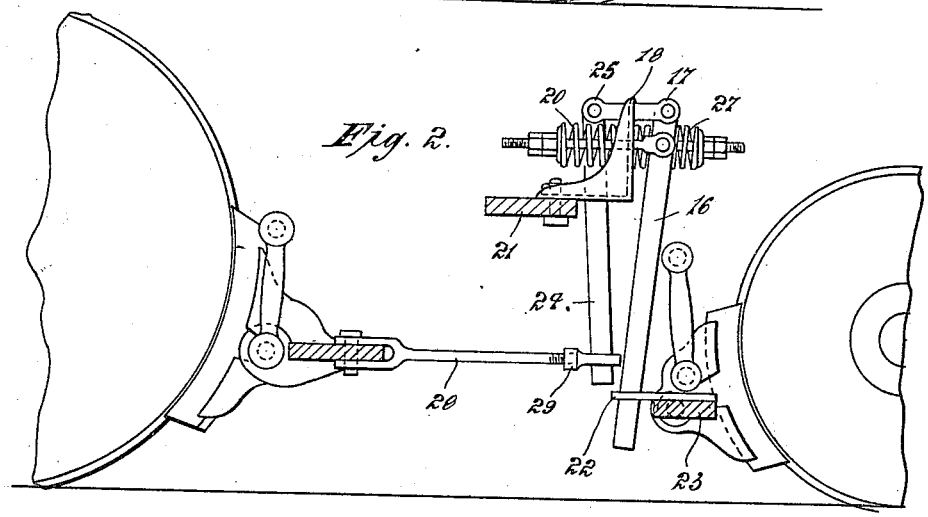
Fig. 2.
Fig. 3.
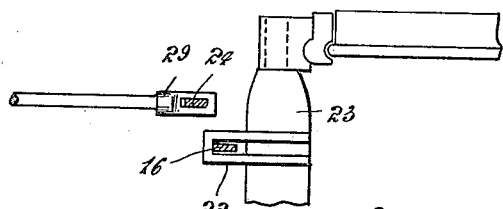

H. LEAH.
BRAKE RELEASE SPRING MECHANISM FOR TRAM AND THE LIKE CARS.
APPLICATION FILED JULY 20, 1921.

1,421,697.

Patented July 4, 1922.
2 SHEETS—SHEET 2.

UNITED STATES PATENT OFFICE.

HOWARD LEAH, OF WELLINGTON, NEW ZEALAND.

BRAKE RELEASE SPRING MECHANISM FOR TRAM AND THE LIKE CARS.

1,421,697.  Specification of Letters Patent.  Patented July 4, 1922.

Application filed July 20, 1921. Serial No. 486,140.

*To all whom it may concern:*

Be it known that I, HOWARD LEAH, a subject of the King of Great Britain and Ireland, residing in Newtown, Wellington, New Zealand, have invented a new and useful Improvement in Brake-Release Spring Mechanism for Tram and the like Cars; and I do hereby declare the following to be a full, clear, and exact description of the same.

This invention relates to means for releasing the brakes of tram-cars of the class in which the brake shoe is normally retained out of contact with the periphery of the wheel by means of springs.

The object of the present invention is to provide an arrangement whereby constant adjusting will be obviated as the brake shoe wears, and also to obtain practically an even release pressure upon the shoe even after wear has taken place, and further to obtain the above objects by a simple method.

In the existing methods of retaining the brake shoe clear of the periphery of the wheel, leaf spring or coil springs in tension have been employed, the tension of these being adjusted at the extremity of the spring where it connects with the original member to which the shoes are attached. As the shoe wears the tension of the springs alters thereby requiring greater effort on the part of the operator when applying the brakes and, therefore, making constant adjustment necessary.

Approved forms of the invention will now be described with the aid of the accompanying drawings, wherein:—

Figure 1, is an elevation showing the device applied to brakes of the driving wheel.

Figure 2, is a side elevation showing a twin form of the device arranged between the driving and pony wheels of a bogie.

Figure 3, is a part plan of the device shown in Figure 2, showing the connection between the device and the brake beams.

Figure 4:
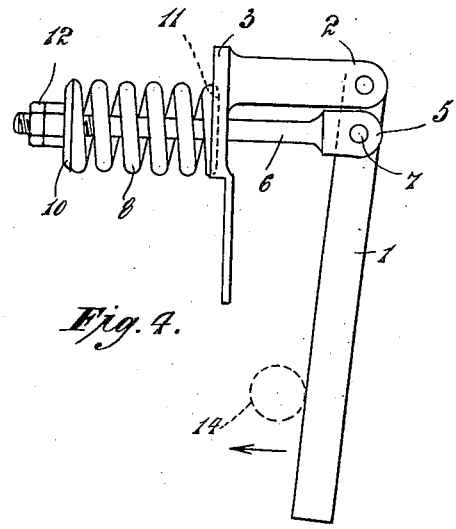
Figure 4, is an elevation of a single device.
Figure 5:
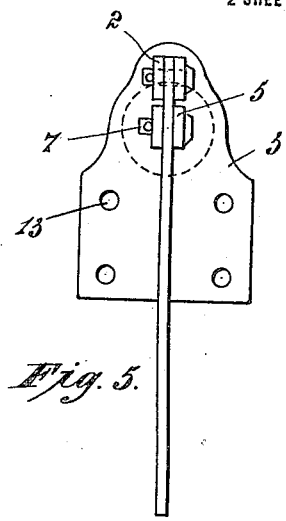
Figure 5, is an end view thereof.
Figure 6:
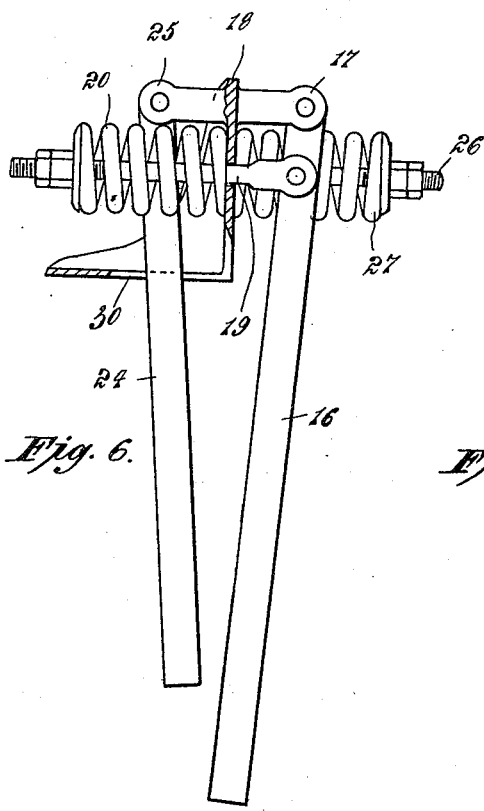
Figure 6, is an elevation partly in section of a twin form of the device.
Figure 7:
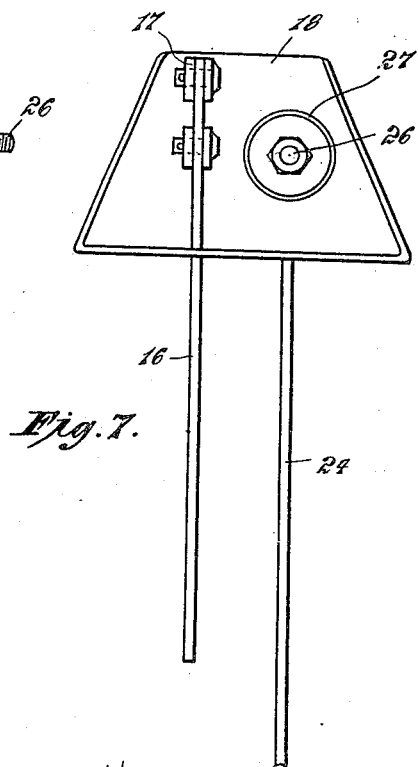
Figure 7, is an end elevation thereof.

Referring to the drawings, and first to Figures 1, 4 and 5, the lever arm 1 is fulcrumed at its upper end in jaws 2 projecting from a bracket 3 which is bolted to a transverse member 4 on the truck. At a comparatively short distance from the fulcrum the arm 1 is pivoted in the jaws 5 of a rod 6 by a pin 7 passing through the jaws of the rod. The rod 6 passes through a hole in the bracket and has a coil spring 8 located upon the rod in compression between a washer 10 and the bracket. The spring rests in a recess 11 in the bracket (shown in dotted lines). The washer is retained on the rod by nuts 12 which also enable the pressure of the spring to be adjusted. The lower end of the arm 1 bears upon the brake beam 14 to which the brake blocks 15 are connected. Holes 13 in the bracket 3 enable it to be bolted to the member 4.

It will be seen that as the spring is in compression and drawing the arm in the direction of the arrow (Fig. 4) such arm will tend to retain the brake shoes in their released position. It will also be seen that since the spring is arranged near the fulcrum of the lever arm, i. e. the weight arm is considerably longer than the power arm, that the lower end of the arm will have a considerably greater radial movement than that of the point at which the power is applied, i. e., the spring. Therefore, the movement of the arm at that point being relatively short, the expansion and contraction of the spring is small and, therefore, the lower end of the arm will not be subject to any great variation of spring pressure. An even pressure will, therefore, be provided upon the brake shoes in their released position during wear and, therefore, constant adjustment of the spring is unnecessary. In the form shown in these figures separate devices would be used to each wheel, for example, upon a bogie truck four devices would be employed.

In Figures 2, 3, 6 and 7, a twin form of the invention is shown, in which two lever arms and their accompanying springs are located on one bracket. In this case one lever arm 16 is fulcrumed in the jaws 17 integral with the bracket 18 and is pivoted to a rod 19 passing through the vertical wall of the bracket and having the springs 20 thereon. This bracket is bolted to a cross bar 21 located at a position between the driving and pony wheels of a bogie (see Figure 2). The lower end of the arm 16 engages in a U shaped member 22 bolted to the pony wheel brake beam 23. The other lever arm 24 is fulcrumed in jaws 25 integral with but upon the opposite side of the bracket 18 to that of the jaws 17, and is pivoted to a rod 26 having a spring 27 located thereon on the opposite side of the brackets to that of the spring 20. The arm 24 passes through a slot 30 in the bracket 18, such slot being of sufficient length to allow the arm the required radial movement. The arm 24 in this case is connected to the brake release rod 28 of the driving wheel brake beam by means of a bracket 29 threaded on the end of the rod 28 through which bracket the arm 24 passes. When the device is in this form it is arranged between the driving and pony wheels of a bogie or between any pair of wheels when the brakes are hung inside such pair of wheels.

What I claim is:—

1. The combination with a car truck having a movably mounted brake beam and a transverse member, of a bracket secured to said transverse member, a horizontally extending arm formed integral with said bracket, a lever having its upper end fulcrumed to the outer end of said arm, the lower free end of said lever being operatively connected to said brake beam, a rod pivotally connected to said lever adjacent its fulcrumed connection, said rod extending through an opening within said bracket, an adjustable washer mounted upon the outer end of said rod and a coil spring encircling said rod and arranged between said washer and said bracket, substantially as and for the purpose specified.

2. The combination with a car truck having movably mounted brake beams and a transverse member, of a bracket secured to said transverse member, a pair of horizontally arranged arms extending in opposite directions and formed integral with said bracket, a lever pivoted to and depending from the outer end of each arm, the lower free ends of said levers being operatively connected to said brake beams, a rod pivotally connected to each lever adjacent its pivoted connection to said arms, said rods adapted to extend through openings formed within said bracket in opposite directions, an adjustable washer arranged upon each rod and a coil spring encircling each rod and arranged between said bracket and said washer substantially as and for the purpose specified.

In testimony whereof, I have signed my name to this specification in the presence of two subscribing witnesses.

HOWARD LEAH.

Witnesses:
EDMOND PATRICK O'DONNELL,
NORA MUIR.